(12) United States Patent
Lu

(10) Patent No.: US 12,181,951 B2
(45) Date of Patent: Dec. 31, 2024

(54) FORECASTING FAILURE OF POWER SUPPLY IN A DATA CENTER

(71) Applicant: AA Power Inc., Boston, MA (US)

(72) Inventor: Qun Lu, Lexington, MA (US)

(73) Assignee: AA Power Inc., Boston, MA (US)

( * ) Notice: Subject to any disclaimer, the term of this patent is extended or adjusted under 35 U.S.C. 154(b) by 48 days.

(21) Appl. No.: 18/095,572

(22) Filed: Jan. 11, 2023

(65) Prior Publication Data

US 2023/0221790 A1 Jul. 13, 2023

Related U.S. Application Data

(60) Provisional application No. 63/298,768, filed on Jan. 12, 2022.

(51) Int. Cl.
*G06F 1/32* (2019.01)
*G06F 1/3296* (2019.01)

(52) U.S. Cl.
CPC .................................. *G06F 1/3296* (2013.01)

(58) Field of Classification Search
CPC ....................................... G06F 1/26; G06F 1/32
See application file for complete search history.

(56) References Cited

U.S. PATENT DOCUMENTS

| | | | | |
|---|---|---|---|---|
| 2001/0046144 A1* | 11/2001 | Murabayashi | ..... | H05K 7/14324 363/69 |
| 2007/0150236 A1* | 6/2007 | Warizaya | ..... | G06F 11/008 702/184 |
| 2010/0007361 A1* | 1/2010 | Yamanaka | ..... | H02M 7/06 324/678 |
| 2012/0151235 A1* | 6/2012 | Nasrullah | ..... | G06F 1/3206 713/323 |
| 2013/0103349 A1* | 4/2013 | Hu | ..... | G01R 31/40 702/182 |
| 2013/0283069 A1* | 10/2013 | Matsuda | ..... | G06F 1/263 713/300 |
| 2016/0006347 A1* | 1/2016 | Matsui | ..... | H02M 3/155 323/304 |
| 2016/0274172 A1* | 9/2016 | Yoshida | ..... | H02M 1/32 |
| 2016/0315575 A1* | 10/2016 | Yamamoto | ..... | G01R 31/00 |
| 2016/0356837 A1* | 12/2016 | Nakao | ..... | G01R 31/64 |
| 2017/0154475 A1* | 6/2017 | Lam | ..... | G07C 3/00 |
| 2020/0313545 A1* | 10/2020 | Takegami | ..... | G01R 31/016 |

* cited by examiner

*Primary Examiner* — Phil K Nguyen
(74) *Attorney, Agent, or Firm* — Occhiuti & Rohlicek LLP

(57) ABSTRACT

An apparatus comprising a power supply, which has first and second components, and actuarial circuitry in communication with the power supply. The actuarial circuitry forecasts the power supply's life expectancy based on real-time measurements of operational parameters of said first and second components.

13 Claims, 3 Drawing Sheets

FORECASTING FAILURE OF POWER SUPPLY IN A DATA CENTER

CROSS REFERENCE TO RELATED APPLICATIONS

This application claims priority to U.S. application Ser. No. 63/298,768, filed on Jan. 12, 2022, the contents of which is hereby incorporated by reference in its entirety.

BACKGROUND

The invention relates to power supplies used for cooling a data-processing apparatus and in particular, power supplies that rely on fans for cooling.

A data center is expected to operate continuously more or less indefinitely. Nevertheless, there are various parts that fail from time to time. These parts must be replaced without interrupting operation.

A data center includes many power supplies, each of which accepts an ac voltage and converts it into a suitable dc voltage for use by data-processing equipment. In the course of doing so, power supplies sustain considerable stress. As a result, power supplies are particularly failure prone.

An unanticipated power supply failure is particularly undesirable since such a failure tends to cause the data-processing apparatus to cease operation. It is therefore desirable to replace a power supply before fails. On the other hand, it is also undesirable to replace a power supply too far in advance of failure.

SUMMARY

In one aspect, the invention features a power supply and actuarial circuitry in communication with the power supply. The power supply includes first and second components. The actuarial circuitry is configured to forecast life expectancy of the power supply based on real-time measurements of operational parameters of the first and second components.

A power supply features numerous components, each of which has an expected lifetime. Values of expected lifetimes are obtained using statistical methods. In any such power supply, there will be one or more components with particularly short lifetimes, far shorter than those of other components. To the extent replacement or repair of such a component is impracticable, such a component is a "life-limiting component." Failure of a life-limiting component impairs the operation of the power supply and generally triggers a need for replacement thereof.

Embodiments include those in which the first and second components are life-limiting components of the power supply. These are components with the shortest expected lifetimes. Among these are embodiments in which the first and second components comprise a fan and an electrolytic capacitor and those in which the first and second components comprise electrolytic capacitors.

Also, among the embodiments are those that further include databases that provide models of the first and second components.

In some embodiments, the power supply is configured to provide first and second data streams to the actuarial circuitry. These data streams include the real-time measurements.

In still other embodiments, the actuarial circuitry includes first and second mortality forecasting circuits that receive real-time data from the power supply and forecast life expectancies of the corresponding first and second components.

In some embodiments, the actuarial circuitry is configured to receive a capacitor data-stream and a fan data-stream from the power supply that has an electrolytic capacitor and a fan. The actuarial circuitry includes a real-time fan-mortality forecasting circuit that receives a stochastic fan model and a real-time capacitor-mortality forecasting circuit that receives a stochastic capacitor model. Based on outputs of the real-time fan-mortality forecasting circuit and the real-time capacitor-mortality forecasting circuit, the actuarial circuitry outputs a plurality of voltages selected from the group consisting of a first voltage and a second voltage. The plurality of voltages forms a pattern that is indicative of a power-supply life expectancy that serves as a basis for scheduling replacement of the power supply.

Embodiments further include those in which the actuarial circuitry includes a comparator that receives forecasted life expectancies of components of the power supply and outputs the smallest of the forecasted life expectancies. These components include the first and second components among them. Among these are embodiments in which the components consist of only the first and second components.

Other embodiments include a first sensor system coupled to the first component for measuring the operational parameters of the first component and a second sensor system coupled to the second component for measuring the operational parameters of the second component.

Among those embodiments in which the first component is a fan are those in which apparatus further includes a thermometer for measuring temperature of the fan, a Hobbs meter that is coupled to measure accumulated time during which the fan has been used, and a tachometer to measure the number of rotations the fan makes per unit time.

Among those embodiments in which the second component is an electrolytic capacitor are those in which the apparatus further including a thermometer for measuring temperature of the electrolytic capacitor, a voltmeter configured to measure voltage across the electrolytic capacitor, and an ammeter configured to measure current through the electrolytic capacitor.

In another aspect, the invention features a process that includes obtaining real-time measurements of first and second sets of operational parameters. The first set includes operational parameters of a first component of the power supply and the second set includes operational parameters of a second set of a power supply that supplies power to IT equipment. The process further includes forecasting expected lifetimes of both the first and second components and, based at least in part on the expected lifetimes of the first and second components, forecasting the life expectancy of the power supply. This is followed by determining that the life expectancy of the power supply is lower than a threshold life expectancy. This is followed by providing an alert to draw attention to the life expectancy.

Among the practices of the process are those that further include selecting the first component to be a fan and selecting the second component to be an electrolytic capacitor.

While the invention has been described in terms of power supplies, the principles relied upon are applicable to other electronic devices or mechanical devices having failure-prone components whose lifetimes need to be estimated to optimize time of replacement.

It is theoretically possible to implement the systems and methods described herein in a non-abstract manner. However, descriptions of such implementations have been purposefully omitted. As a result, the claims cover only non-abstract implementations. Any person who construes the claims to cover abstract subject matter would merely be demonstrating that it is possible to construe claims improperly in a manner that contradicts the specification.

As used herein, the term "non-abstract" shall be construed to mean the converse of "abstract" has the courts have defined that term as of the filing date of this application.

The various devices described herein are implemented as electronic circuitry that comprises matter and that consumes energy in operation. Devices that are not made of matter and that do not consume energy in operation have been omitted from the description.

These and other features of the invention will be apparent from the following detailed description and the accompanying figures, in which:

DETAILED DESCRIPTION

Figure 1:
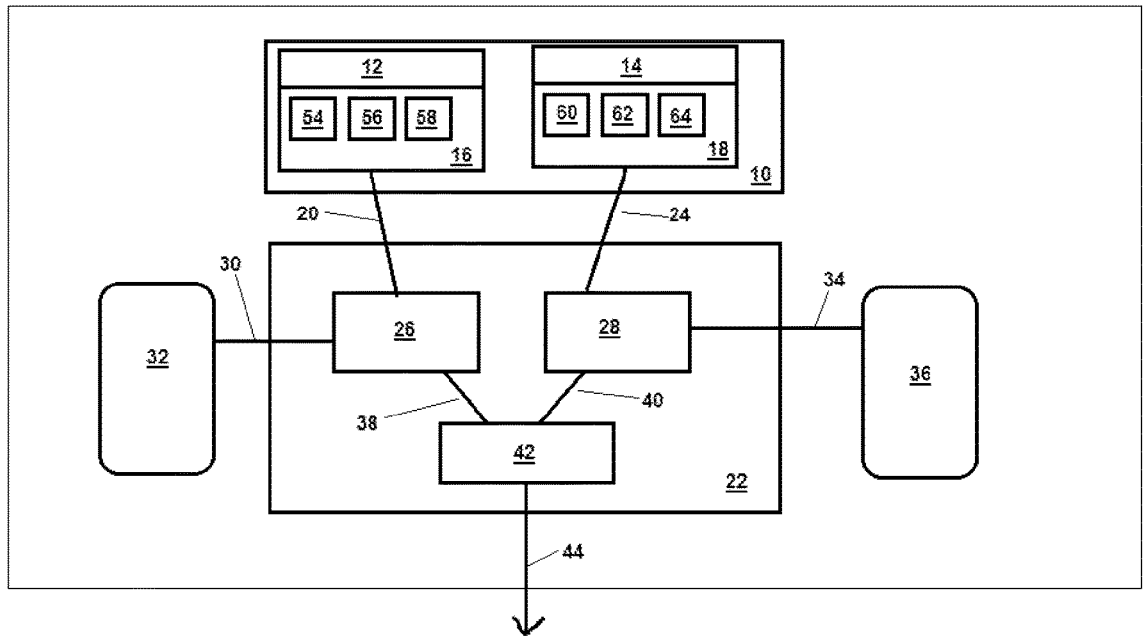
FIG. 1 shows a power supply with an accompanying actuarial circuit.

FIG. 1 shows a power supply 10 having a fan 12, an electrolytic capacitor 14, a fan sensor-system 16, which is coupled to the fan 12, and a capacitor sensor-system 18, which is coupled to the capacitor 14.

The fan sensor-system 16 measures operational parameters associated with the fan's operation. Such parameters include how long the fan 12 has been running, the temperature in the fan's vicinity, and the fan's speed. These parameters define measured time-varying functions that are provided as a fan data-stream 20 to an actuarial circuit 22.

To sense these operational parameters, the fan sensor-system 16 includes a fan thermometer 54 that measures the fan's temperature, a Hobbs meter 56 that measures the accumulated time of the fan's usage, and a tachometer 58 to measure the number of revolutions made by the fan 12 per unit time.

Similarly, the capacitor sensor-system 20 measures operational parameters associated with the capacitor's operation. Such parameters include the voltage across the capacitor 14, including the sign of that voltage, the current into the capacitor 14, including the sign of that current, and the temperature of the capacitor's casing These parameters define three additional measured time-varying functions that are provided as a capacitor data-stream 24 to the actuarial circuit 22.

To sense these operational parameters, capacitor sensor-system 18 includes a capacitor thermometer 60 that measures the capacitor's temperature, a voltmeter 62 that measures voltage across the capacitor 14, and an ammeter 64 that that measures current into the capacitor 14, thus providing a way to determine the capacitor's internal resistance.

The actuarial circuit 22 includes a real-time fan-mortality forecasting circuit 26 and a real-time capacitor-mortality forecasting circuit 28. The real-time fan-mortality forecasting circuit 26 receives both the fan data-stream 20 and a stochastic fan-model 30 from a fan database 32. The real-time capacitor-mortality forecasting circuit 28 receives both the capacitor data-stream 24 and a stochastic capacitor-model 34 from a capacitor database 36.

The stochastic fan-model 30 is typically supplied by the fan's manufacturer. Such a model reflects the manufacturer's efforts at predicting the fan's remaining lifetime based on parameters associated with the fan's operation. Similarly, the stochastic capacitor-model 34 is typically supplied by the capacitor's manufacturer and reflects the manufacturer's efforts at predicting the capacitor's remaining lifetime based on parameters associated with the capacitor's operation.

The real-time fan-mortality forecasting circuit 26 uses the fan data-stream 20 and the stochastic fan-model 30 to dynamically adjust the fan's life expectancy 38 in real time. Similarly, the real-time capacitor-mortality forecasting circuit 28 uses the capacitor data-stream 24 and the stochastic capacitor-model 34 to dynamically adjust the capacitor's life expectancy 40 in real time.

In some embodiments, the stochastic fan-model 30 comprises data collected from similar fans that have failed in the past. This data is keyed to life expectancy. Thus, by comparing the fan data-stream 20 with the data stored that comprise the stochastic fan-model 30, it is possible for the real-time fan-mortality forecasting circuit 26 to forecast life expectancy for the fan 12 with reasonable accuracy.

In some embodiments, the stochastic capacitor-model 34 comprises data collected from similar capacitors that have failed in the past. This data is keyed to life expectancy. Thus, by comparing the capacitor data-stream 24 with the data stored that comprise the stochastic capacitor-model 34, it is possible for the real-time capacitor-mortality forecasting circuit 28 to forecast life expectancy for the capacitor 14 with reasonable accuracy.

In other embodiments, the stochastic capacitor-model 34 forecasts the capacitor's life expectancy based on observations of voltage applied across the capacitor 14, its temperature, and detection of either ripples in the current flowing into the capacitor 14, and/or current surges into the capacitor 14. These observed while the power supply 10 is in operation and are used as a basis for determining a deduction in life expectancy from the capacitor's initial expected lifetime.

The real-time capacitor-mortality forecasting circuit 28 provides the capacitor's life expectancy 40 to a comparator 42. Similarly, the real-time fan-mortality forecasting circuit 26 provides the fan's life expectancy 38 to the comparator 42. The comparator outputs a plurality of voltages, the pattern of which is indicative of the smaller of the fan's life expectancy 38 and the capacitor's life expectancy 40. This pattern of voltages thus serves as a forecasted power-supply life expectancy 44. This forecasted power-supply life expectancy 44 provides a basis for scheduling replacement of power supplies at an opportune time that is before the probability of failure rises past a selected threshold.

Figure 2:
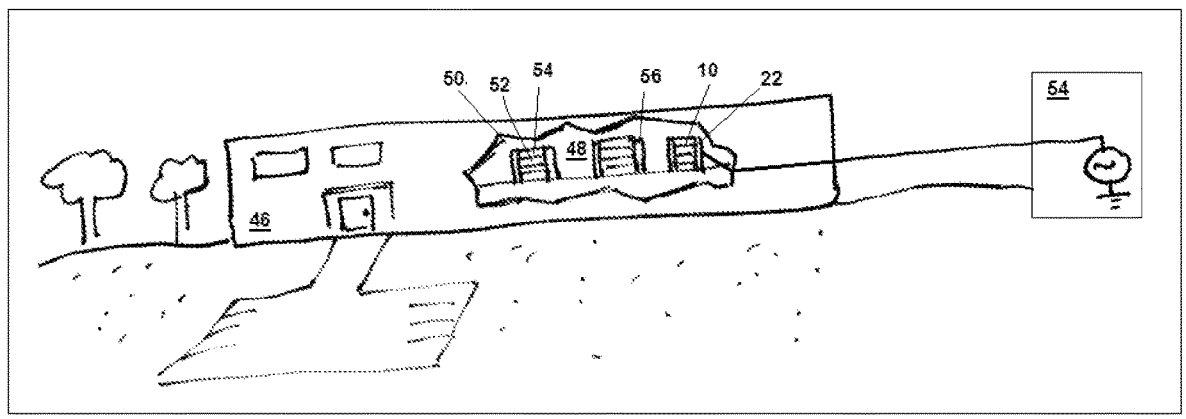
FIG. 2 shows the actuarial circuit of FIG. 1 installed in a data center.

FIG. 2 shows an internet data center 46 having a data room 48 that holds IT equipment that comprises power consumers 50, such as servers 52 and routers 54. These are often mounted on racks 56. In some embodiments, the power supply 10 and its accompanying actuarial circuit 22 operate within the internet data center 46.

The data center 46 receives ac power transmitted from a utility 54. This ac power is generally unsuited to operating the power consumers 50 and must be converted into suitable dc power. The power supply 10 carries out this function. In a typical data center 46, there are many such power supplies 10, each of which converts ac power into suitable dc power. Such power supplies 10 are often referred to as ac/dc converters.

Figure 3:
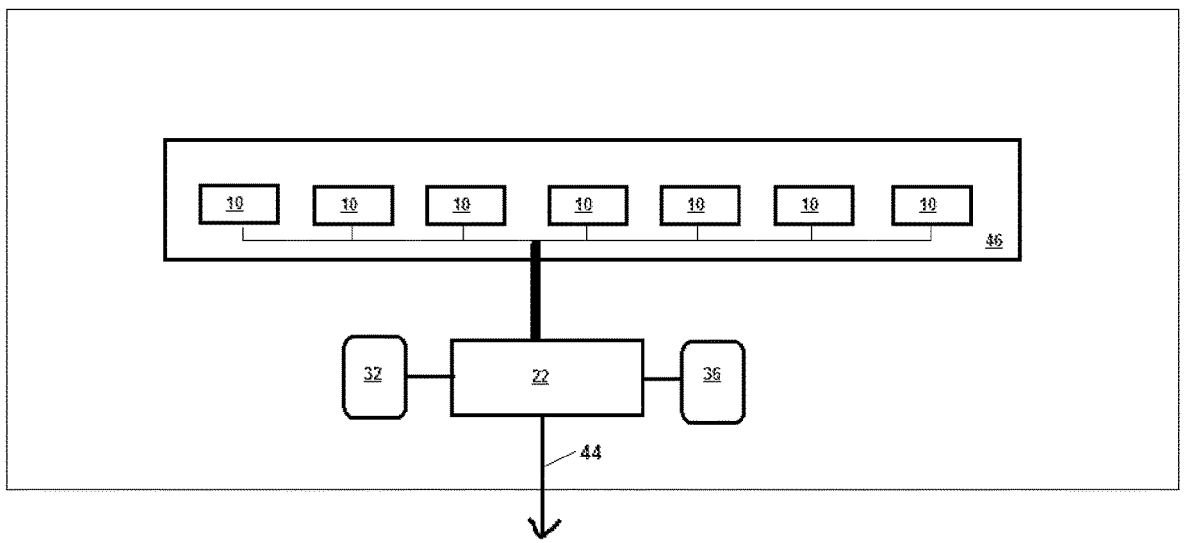
FIG. 3 shows power supplies in the data center of FIG. 2 connected to the actuarial circuit of FIG. 1.

In some embodiments, the actuarial circuit 22 is local to the power supply 10. Thus, each power supply 10 would have its own actuarial circuit 22. However, in other embodiments, the actuarial circuit 22 is a shared resource that connects to both the power supply 10 and to a plurality of other power supplies. Among these are embodiments in which the actuarial circuit 22 is shared by all power supplies 10 in the data center 46, as shown in FIG. 3.

In some embodiments, the actuarial circuit 22 receives information indicative of other properties of the power supply, such as its date of manufacture or its location in the data center 46. Information concerning a power supply's date of manufacture may be useful if, for example, it is known that power supplies manufactured during a particular interval possess lifetimes that differ from those manufactured in other intervals. Knowledge of location within a data center 46 is useful for recognizing flaws in the data center's cooling system. For example, if it is determined that all power supplies in a particular wing of the data center 46 are running hot, one can infer that something may be wrong with the cooling system in that wing and therefore dispatch maintenance personnel accordingly.

Figure 4:
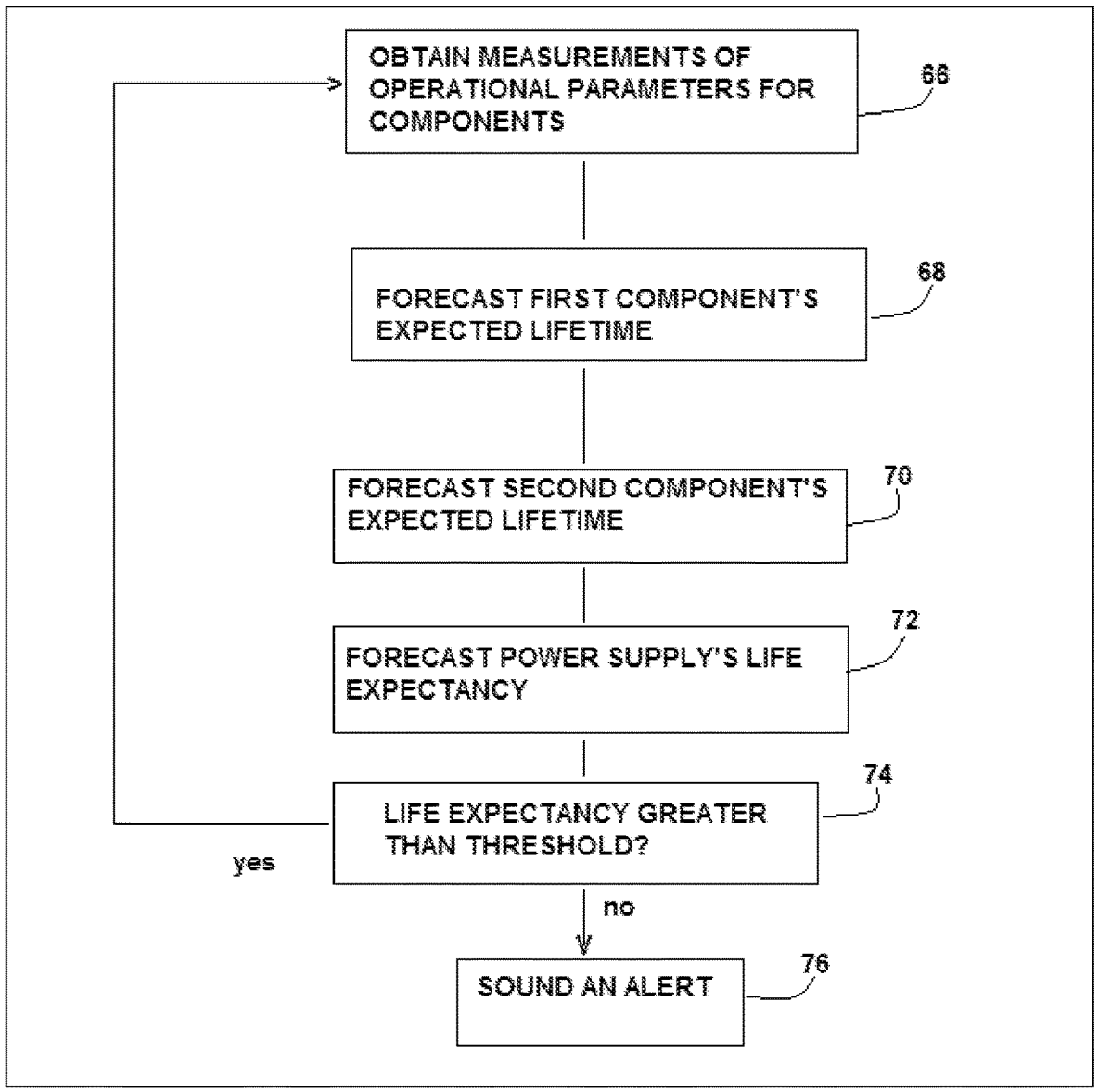
FIG. 4 shows a method carried out by the actuarial circuit of FIG. 1

FIG. 4 shows a method for announcing a recommendation to replace a power supply 10 that begins with obtaining measurements of operational parameters of two or more components of the power supply (step 66) and using those measurements as a basis for dynamically forecasting their respective expected lifetimes (steps 68, 70). This is followed by forecasting the power supply's life expectancy (step 72) based on the forecasted expected lifetimes and a comparison between the power supply's life expectancy and some user-defined threshold (step 74). If the power supply's life expectancy falls short of the threshold, an alert is sounded (step 76). Otherwise, further measurements of operational parameters are obtained (step 66).

The embodiments described herein illustrate the principles of the invention without limiting its scope, which is defined by the scope of the appended claims.

What is claimed is:

1. An apparatus comprising: a power supply and actuarial circuitry in communication with said power supply, said power supply comprising first and second components, wherein said actuarial circuitry is configured to forecast life expectancy of said power supply based at least in part on real-time measurements of operational parameters of said first and second components, wherein said actuarial circuitry is configured to receive a capacitor data-stream and a fan data-stream from said power supply, wherein said first and second components of said power supply having an electrolytic capacitor and a fan, respectively, wherein said actuarial circuitry comprises a real-time fan-mortality forecasting circuit that receives a stochastic fan model and a real-time capacitor-mortality forecasting circuit that receives a stochastic capacitor model, wherein, based on outputs of said real-time fan-mortality forecasting circuit and said real-time capacitor-mortality forecasting circuit, said actuarial circuitry outputs a plurality of voltages selected from the group consisting of a first voltage and a second voltage, said plurality of voltages forming a pattern that is indicative of a power-supply life expectancy that serves as a basis for scheduling replacement of said power supply.

2. The apparatus of claim 1, further comprising databases that provide models of said first and second components.

3. The apparatus of claim 1, wherein said power supply is configured to provide first and second data streams to said actuarial circuitry, said first and second data streams comprising said real-time measurements.

4. The apparatus of claim 1, wherein said actuarial circuitry comprises first and second mortality forecasting circuits that receive real-time data from said power supply and forecast life expectancies of said corresponding first and second components.

5. The apparatus of claim 1, wherein said actuarial circuitry comprises a comparator that receives forecasted life expectancies of components of said power supply, said components comprising said first and second components, and outputs the smallest of said forecasted life expectancies.

6. The apparatus of claim 1, further comprising a first sensor system coupled to said first component for measuring said operational parameters of said first component and a second sensor system coupled to said second component for measuring said operational parameters of said second component.

7. The apparatus of claim 1, further comprising a thermometer for measuring temperature of said fan, a Hobbs meter that is coupled to measure accumulated time during which said fan has been used, and a tachometer to measure the number of rotations said fan makes per unit time.

8. The apparatus of claim 1, further comprising a thermometer for measuring temperature of said electrolytic capacitor, a voltmeter configured to measure voltage across said electrolytic capacitor, and an ammeter configured to measure current through said electrolytic capacitor.

9. The apparatus of claim 1, wherein said power supply is one of a plurality of power supplies within a data center and wherein actuarial circuitry is configured to forecast said life expectancy based at least in part on information obtained from other power supplies within said data center.

10. The apparatus of claim 1, wherein said actuarial circuitry is configured to forecast said life expectancy based at least in part on information obtained from a manufacturer of said power supply, said information being indicative of life expectancies of power supplies similar to said power supply.

11. The apparatus of claim 1, wherein said first and second components are the components with the shortest expected lifetimes.

12. The apparatus of claim 1, wherein said actuarial circuitry comprises a non-generic computer system.

13. A method of scheduling replacement of a power supply that comprises an electrolytic capacitor and a fan, said method comprising: receiving a capacitor data-stream and a fan data-stream from said power supply; receiving a stochastic fan-model; receiving a stochastic capacitor-model; using said stochastic fan-model and said stochastic capacitor-model to output a plurality of voltages selected from the group consisting of a first voltage and a second voltage, said plurality of voltages forming a pattern that is indicative of a power-supply life expectancy that serves as a basis for scheduling replacement of said power supply; and, based on said plurality of voltages, scheduling said replacement of said power supply.

* * * * *